(12) United States Patent
Yamamoto

(10) Patent No.: US 8,294,774 B2
(45) Date of Patent: Oct. 23, 2012

(54) IMAGER THAT PHOTOGRAPHS AN IMAGE USING A ROLLING SHUTTER

(75) Inventor: Yasuhiro Yamamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 365 days.

(21) Appl. No.: 12/814,639

(22) Filed: Jun. 14, 2010

(65) Prior Publication Data

US 2010/0321517 A1 Dec. 23, 2010

(30) Foreign Application Priority Data

Jun. 17, 2009 (JP) ................. 2009-144423

(51) Int. Cl.
*H04N 5/228* (2006.01)
*H04N 3/14* (2006.01)
*H04N 5/335* (2011.01)

(52) U.S. Cl. .................. 348/208.6; 348/222.1; 348/296

(58) Field of Classification Search ............. 348/208.99, 348/208.1, 208.2, 208.4, 208.6, 222.1, 296, 348/302
See application file for complete search history.

(56) References Cited

U.S. PATENT DOCUMENTS 8,009,872 B2 * 8/2011 Kurata ......................... 382/107
2006/0157760 A1 7/2006 Hayashi et al.
2007/0177037 A1 * 8/2007 Kurata .......................... 348/241

FOREIGN PATENT DOCUMENTS

JP 2006-191236 7/2006

OTHER PUBLICATIONS

Yasuhiro Yamamoto. "Imager That Photographs an Image Using a Rolling Shutter", U.S. Appl. No. 12/814,644, filed Jun. 14, 2010, PP.

* cited by examiner

*Primary Examiner* — Nicholas Giles
(74) *Attorney, Agent, or Firm* — Greenblum & Bernstein, P.L.C.

(57) ABSTRACT

An imager is provided having an imaging sensor and a focusing detector. The imaging sensor reads stored charges in a positive or negative direction and outputs image data created from the read charges. The comparator calculates a differential between first image data output by said imaging sensor and second image data output by the imaging sensor immediately after the first image data is output, and determines whether the differential is larger than a first threshold value. The composer creates composite image data from the data of two images output by the imaging sensor. When the comparator determines that the differential is larger than the first threshold value, the composer creates composite image data from the second image data and negatively scanned image data that is obtained by scanning the second image in a direction that is opposite to the scanning direction of the second image data.

13 Claims, 5 Drawing Sheets

~114

SCANNING
DIRECTION ↓

~114

SCANNING
DIRECTION ↑

~114

~114

IMAGER THAT PHOTOGRAPHS AN IMAGE USING A ROLLING SHUTTER

BACKGROUND OF THE INVENTION

1. Field of the Invention

The present invention relates to an imager comprising an imaging sensor that captures an image using a rolling shutter.

2. Description of the Related Art

A well-known imaging sensor used for capturing an image has photodiodes arranged on a two-dimensional plane. An imager continuously displays image data output from the imaging sensor to a display. The images are visible to a user watching the display, and the through image can be recognized. United States Published Patent Application Publication Number 2006-0157760 A1 discloses a CMOS imaging sensor as an imaging sensor used in an imager.

However, a CMOS imaging sensor photographs using a rolling shutter, so that the moment of exposure for each photodiode provided in a CMOS imaging sensor is different in the vertical direction. Therefore, in the case that position, size, etc. of a subject changes with time, displayed images and moving pictures become distorted and unsightly.

SUMMARY OF THE INVENTION

An object of the present invention is to provide an imager that displays an image on a display with minimal distortion in the case of photographing a dynamic subject that experiences a large change.

An imager is provided having an imaging sensor and a focusing detector. The imaging sensor reads stored charges in a positive or negative direction and outputs image data created from the read charges. The comparator calculates a differential between first image data output by said imaging sensor and second image data output by the imaging sensor immediately after the first image data is output, and determines whether the differential is larger than a first threshold value. The composer creates composite image data from the data of two images output by the imaging sensor. In the case that the comparator determines that the differential is larger than the first threshold value the composer creates composite image data from the second image data and negatively scanned image data that is obtained by scanning the second image in the negative direction, which is opposite to the scanning direction of the second image data.

BRIEF DESCRIPTION OF THE DRAWINGS

The objects and advantages of the present invention will be better understood from the following description, with references to the accompanying drawings in which.

DESCRIPTION OF THE PREFERRED EMBODIMENTS

Figure 1:
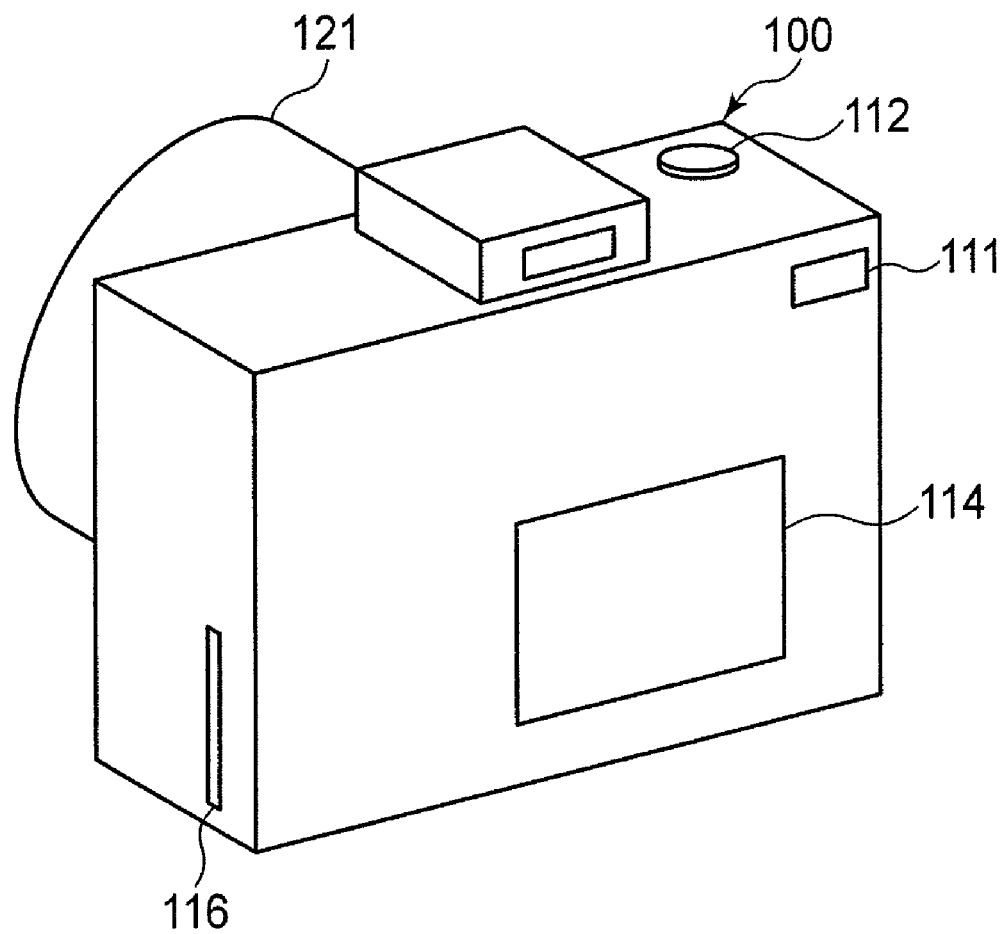
FIG. 1 is a perspective view of an imager as seen from its rear surface according to the embodiment of the present invention.

The present invention is described below with references to the embodiment shown in the drawings.

Figure 2:
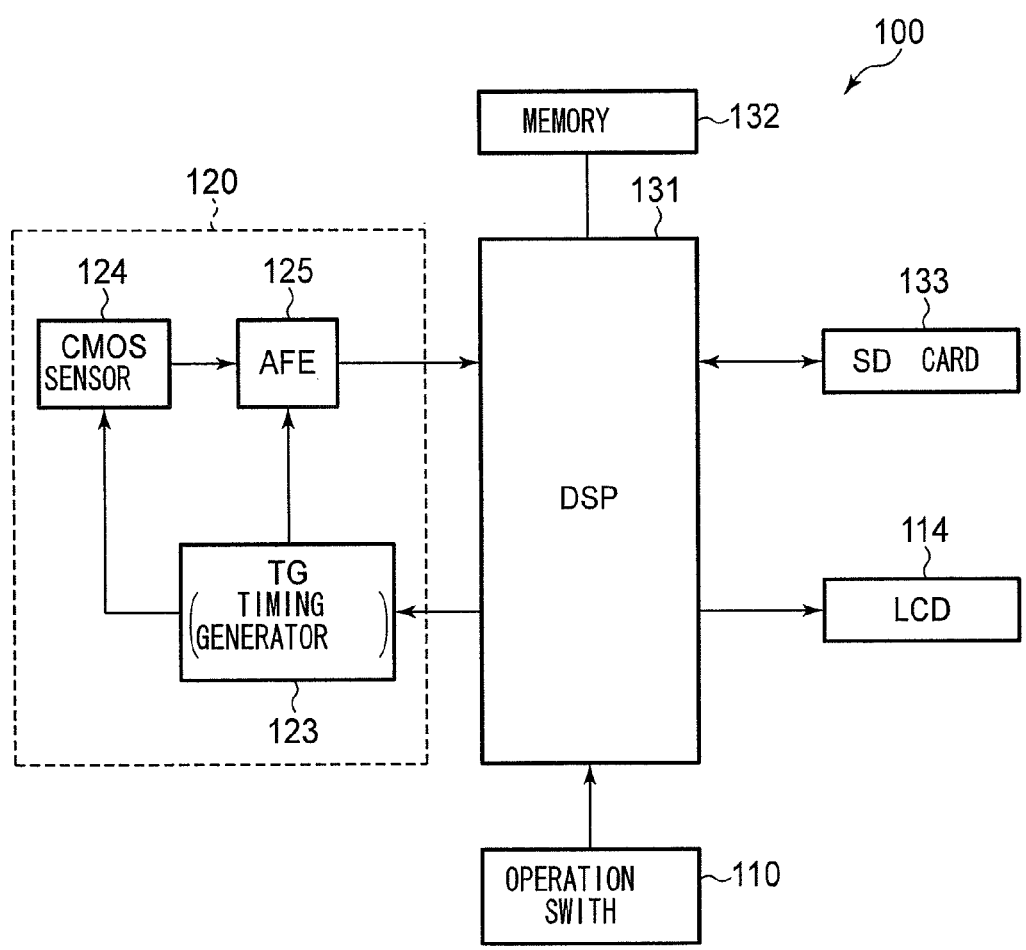
FIG. 2 is a block diagram of the imager.

FIGS. 1 and 2 show a digital camera 100 that is an imager according to the present embodiment. For example, the digital camera is a compact camera.

The camera is equipped with a main power switch 111 that activates and deactivates a main power source, a release button 112, an LCD monitor 114, a card slot 116, and an imaging lens 121 that projects from the front surface of the digital camera. The main power switch 111 and the release button 112 are comprised of an operation switch 110.

The main power switch 111 is a momentary switch projecting from the back surface of the digital camera 100. The digital camera 100 is powered-on when a user depresses the main power switch 111. In the case that a user depresses the main power switch 111 while the digital camera 100 is powered, the digital camera 100 is powered-off.

The release button 112 is a two-step momentary switch that is provided on the top of the digital camera 100. In the case that a user depresses the release button 112 halfway, the digital camera carries out photometry, distance surveying processes. In the case that a user fully depresses the release button 112, the digital camera captures an image.

The LCD monitor 114 is rectangular-shaped with the same 3:4 aspect ratio as a photographed image. As illustrated in FIG. 1, it is a rectangle of which the long sides extend in the longitudinal direction of the digital camera 100, and it is provided near the center of the back surface of the digital camera 100. It displays a through image and an image obtained through the photographing lens 121, a photographed image, and configuration settings of the digital camera 100.

Components provided in the digital camera are described with reference to FIG. 2. The digital camera 100 mainly comprises a DSP 131 that controls the operation of the digital camera 100, the operation switch 110 that is used for operating the digital camera 100, an imaging unit 120 that converts a subject image to a digital image signal, a memory 132 that stores data sent from the DSP 131, a SD card 133 that stores a photographed image, and the LCD monitor 114. The imaging unit 120 mainly comprises a CMOS imaging sensor 124, an AFE (Analog Front End) 125, and a timing generator 126.

The imaging lens 121 focuses a subject image on the imaging area of the CMOS imaging sensor 124. The CMOS imaging sensor 124 has an imaging area in which an incoming subject image is converted to analog image signal. The imaging area is rectangular-shaped and provided in the digital camera 100 so that the long side of the imaging area is coincident with the direction from right to left in FIG. 1 and the short side of the imaging area is coincident with the direction from top to bottom in FIG. 1. Multiple photodiodes are aligned on the imaging area. Photodiodes aligned in the long direction are referred to as a line and photodiodes aligned in the short direction are referred to as a row, hereinafter.

The CMOS imaging sensor 124 converts a subject image formed on the imaging area to an analog image signal, and then sends the analog image signal to the AFE 125. The AFE 125 converts an analog image signal to a digital image signal after adjusting the gain of the analog image signal, and then sends the digital image signal to the DSP 131.

The CMOS imaging sensor 124 uses a rolling shutter to output analog image signals. The rolling shutter is a kind of signal-reading procedure that outputs an analog image signal for each line of the CMOS imaging sensor 124, i.e. for each group of photodiodes aligned in the long direction. The CMOS imaging sensor 124 according to the embodiment outputs an analog image signal in the scanning direction that runs from the top to the bottom of the imaging area, and then outputs an analog image signal in the scanning direction that runs from the bottom to the top of the imaging area. After that, the CMOS imaging sensor 124 outputs an analog image signal in the scanning direction that runs from the top to the bottom of the imaging area. That is, it outputs a signal alternatingly from top to bottom and from bottom to top. Hereinafter, the scanning direction that runs from the top to the bottom of the imaging area is the positive direction, and the scanning direction that runs from the bottom to the top of the imaging area is the negative direction.

The timing generator 126 sends a timing signal to both the CMOS imaging sensor 124 and the AFE 125 that is based on a signal from the DSP 131. The CMOS imaging sensor 124 and the AFE 125 operate on the basis of the timing signal.

Before imaging, the DSP 131 carries out a photometry process for a subject using a quantity of light from the subject image that is included in the digital image signal. It calculates an exposure value from a photometry value and then calculates the shutter speed and aperture value that are used in photographing. After that, a photograph is taken based on the calculated shutter speed and aperture value. The DSP 131 controls the photographing lens 121 using the received digital image signal, and the subject image is brought into focus on the imaging area of the CMOS imaging sensor.

After receiving a digital image signal from the AFE 125, the DSP 131 processes the digital image signal and sends it to the LCD monitor 114 as a through image.

The DSP 131 processes received digital image signals and creates image data that contains data for one frame of an image during photographing. The image data is stored in the SD card 133 and displayed on the LCD monitor 114. The memory 132 is used as a working memory in which intermediate data are temporarily stored while the DSP 131 makes calculations and carries out image processing.

The SD card 133 is detachably stored in the card slot 116 provided on the side of the digital camera 100. A user can change an SD card 133 by accessing the card slot 116 from the exterior of the digital camera 100.

In the case of photographing a subject whose condition changes with respect to time, the condition of the subject may change while the charges stored in all of the lines or rows of photodiodes can be output. The moment for storing a charge in each photodiode is different for each line because the CMOS imaging sensor 124 outputs analog image signals using a rolling shutter. Therefore, an image output by the CMOS imaging sensor 124 may be distorted.

Figure 3:
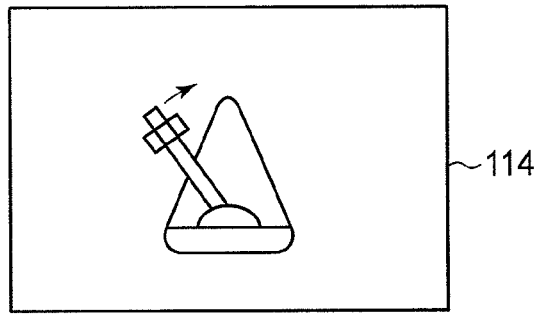
FIG. 3 is a subject image with a minimal distortion.

Distortion of an output image is described in detail hereinafter with references to FIG. 3. FIG. 3 shows a metronome as a subject that is photographed by the digital camera 100. The metronome has a pendulum that swings back and forth for short period about a vertical axis.

Figure 4:
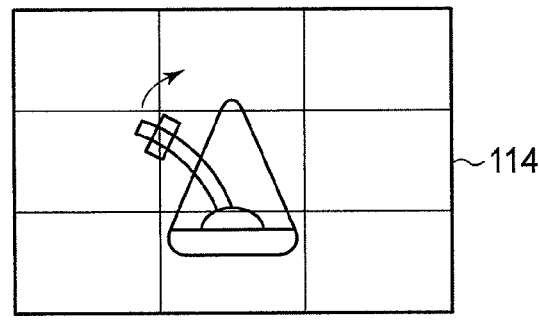
FIG. 4 shows distortion caused by using a rolling shutter in the case of scanning from top to bottom.

FIG. 4 shows an image obtained in the case that the CMOS imaging sensor 124 outputs an analog image signal after scanning in the positive direction. The distortion of the image is exaggerated for illustrative purposes. The pendulum moves from the moment that the CMOS imaging sensor 124 photographs the tip of the pendulum to the moment that the CMOS imaging sensor 124 photographs the axis of the pendulum. Therefore, in the photograph the straight arm of the pendulum appears to have a convex curve toward the top of the metronome.

Figure 5:
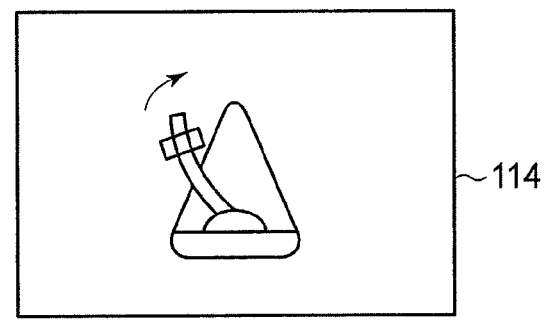
FIG. 5 shows distortion caused by using a rolling shutter in the case of scanning from bottom to top.

FIG. 5 shows an image obtained in the case that the CMOS imaging sensor 124 outputs an analog image signal after scanning in the negative direction. The distortion of the image is exaggerated for illustrative purposes. The pendulum moves from the moment that the CMOS imaging sensor 124 photographs the axis of the pendulum to the moment that the CMOS imaging sensor 124 photographs the tip of the pendulum. Therefore, in the photograph the straight arm of the pendulum appears to have a convex curve toward the bottom of the metronome.

Figure 6:
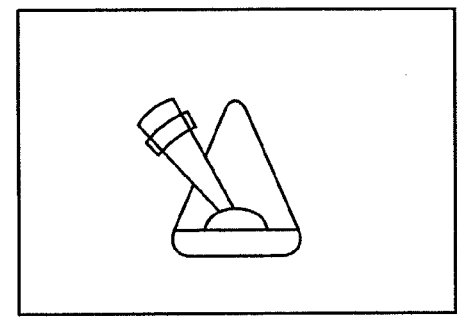
FIG. 6 shows an image obtained by a first distortion reduction process.

To prevent deformation, the first distortion reduction process is performed. In the first distortion reduction process, if the movement of a subject is greater than a threshold value the image signal output by the CMOS imaging sensor 124 after scanning in the positive direction and the image signal output by the CMOS imaging sensor 124 after scanning in the negative direction are averaged together so that an image with minimal distortion is obtained. As a result of this process the image shown in FIG. 6 is obtained.

Figure 7:
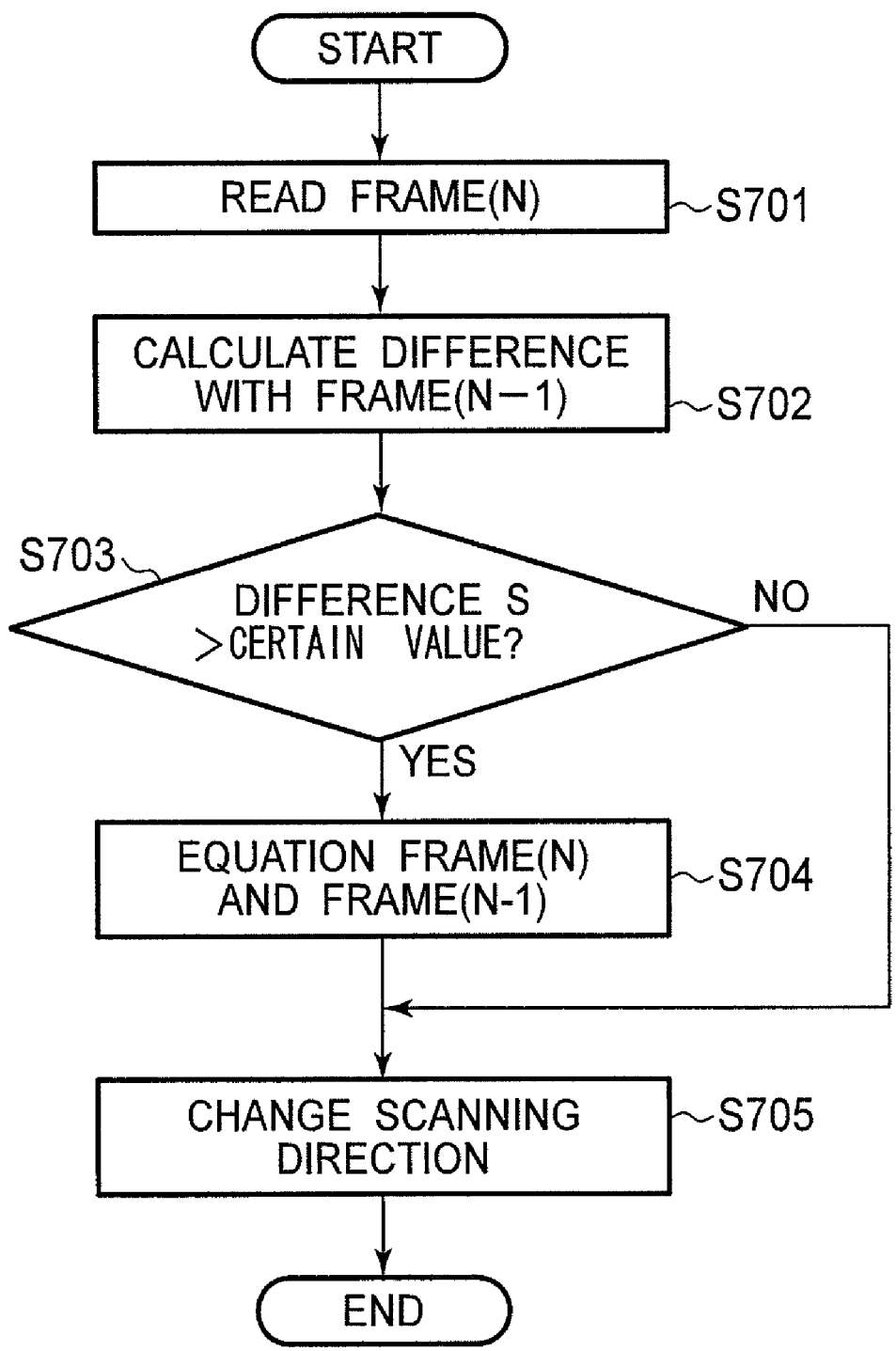
FIG. 7 is a flowchart of the first distortion reduction process.

The first distortion reduction process is described with reference to FIG. 7. In the case that a through image is displayed on the LCD monitor 114 or a moving picture is taken, the first distortion reduction process is executed. In the memory 132 the DSP 131 stores one frame image read from the CMOS imaging sensor 124 immediately prior to executing the process.

In Step S701, the DSP 131 reads a frame image from the CMOS imaging sensor 124. Hereinafter, this frame image is the frame image N.

In Step S702, the DSP 131 calculates the difference S between the frame image N and a frame image N−1 previously read from the CMOS imaging sensor 124 and stored in the memory 132. The frame image N−1 comprises an image signal captured and output by the CMOS imaging sensor after scanning in a direction opposite to the scanning direction of the frame image N.

The difference S is calculated by the formula described below.

$$S = \sum_{y=0}^{Y_n} \sum_{x=0}^{X_n} |P_n(x, y) - P_{n-1}(x, y)|$$

Where Pn(x,y) is a color signal of a pixel (x,y) provided in the frame image N. The differential S obtained by calculating the summation of the differential between the color signal of pixel (x,y) in the frame image N and the color signal of pixel (x,y) in the frame image N−1 for all pixels. The differential S is calculated for all red, green, and blue color signals. According to calculation of the differential S, color shift is prevented.

In Step S703, it is determined whether or not the differential S exceeds a certain value. The certain value is an experimental value such that an image photographed using a rolling shutter does not become distorted. In the case that the differential S is larger than a certain value, the process proceeds to Step S704. In the case that the differential S is smaller than or equal to a certain value, the process proceeds to Step S705 without carrying out Step S704.

In Step S704, the equation for the frame image N and the frame image N−1 is calculated. The equation for the frame image N is calculated by computing the average color signal among each pixel in the frame image N. The equation for the frame image N−1 is calculated in a similar fashion.

In Step S705, the scanning direction is changed, i.e. inverted. Thereby, preparation for reading the next frame image is set. Then, the process ends.

According to the embodiment, the imager 100 can display an image with minimal distortion on the LCD monitor 114 in the case of photographing a dynamic subject that experiences a large change.

Figure 8:
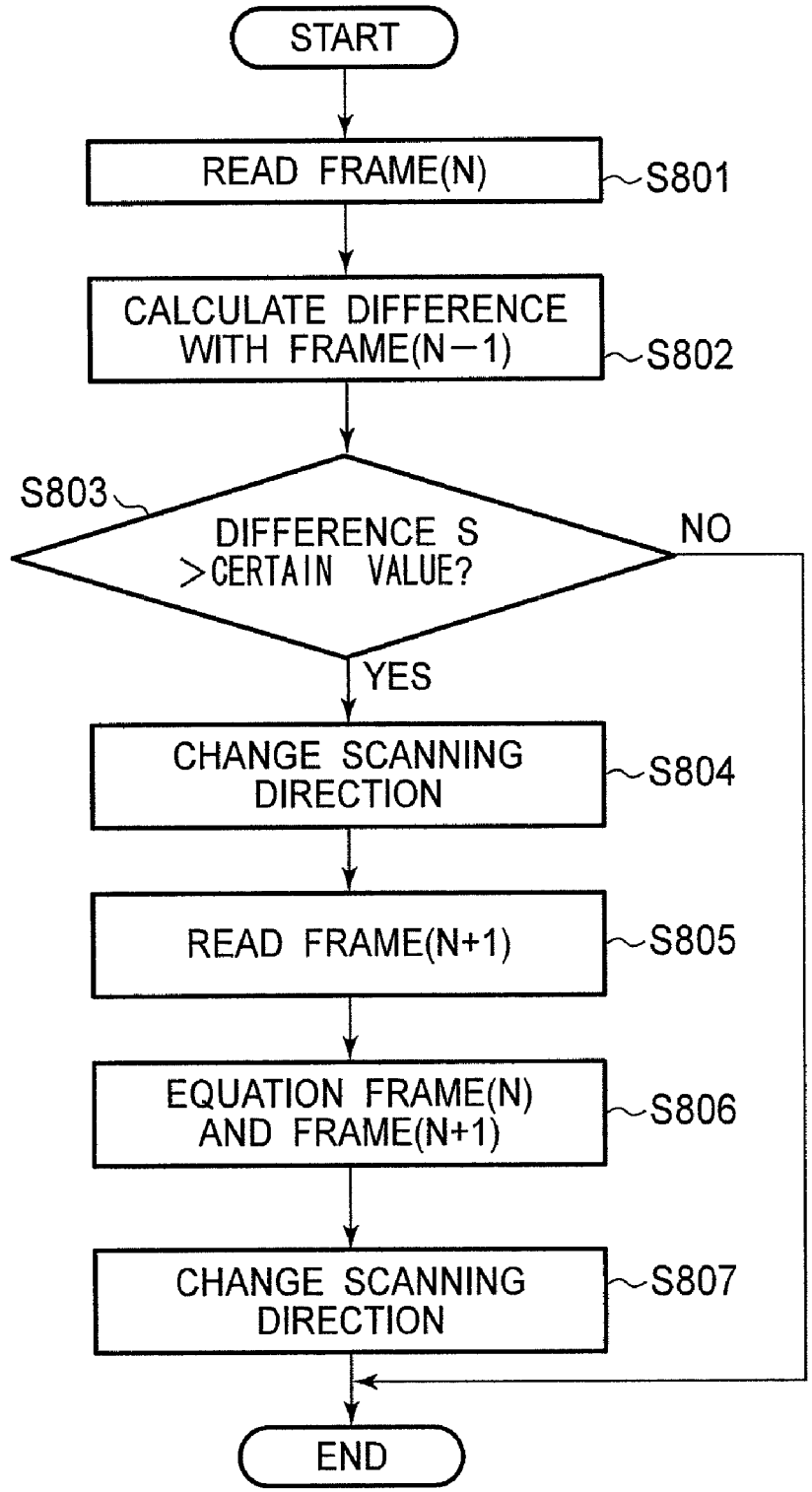
FIG. 8 is a flowchart of a second distortion reduction process.

A second embodiment is described hereinafter with references to FIG. 8. The constructions of the second embodiment that are similar to the first embodiment have the same numeral applied and their descriptions have been omitted. The CMOS imaging sensor 124 according to the second embodiment outputs an analog image signal in a scanning direction that runs from top to bottom of the imaging area. The scanning direction is normally from top to bottom in the second embodiment.

The DSP 131 carries out a distortion reduction process. The second distortion reduction process is described with references to FIG. 8. In the case that either a through image is displayed on the LCD monitor 114 or a moving picture is taken, the second distortion reduction process is executed. The DSP 131 stores in the memory 132 a frame image that is read from the CMOS imaging sensor 124 immediately prior to executing the distortion reduction process.

In Step S801, the DSP 131 reads a frame image from the CMOS imaging sensor 124. Hereinafter, this frame image is a frame image N.

In Step S802, the DSP 131 calculates a difference S between a frame image N and a frame image N−1 that was previously read from the CMOS imaging sensor 124 and stored in the memory 132. The frame image N−1 comprises an image signal output by the CMOS imaging sensor that was created by scanning in the same direction as the scanning direction of the frame image N.

In Step S803, it is determined whether or not the differential S exceeds a certain value. The certain value is an experimental value such that an image photographed using a rolling shutter does not become distorted. In the case that the differential S is larger than a certain value, the process proceeds to Step S804. In the case that the differential S is smaller than or equal to a certain value, the process ends.

In Step S804, the scanning direction is changed, i.e. inverted. Thereby, preparation for reading next frame image is set.

In Step S805, the DSP 131 reads a frame image from the CMOS imaging sensor 124. Hereinafter, this frame image is a frame image N+1.

In Step S806, the equation for the frame image N and the frame image N+1 is calculated. The equation for the frame image N is computed by calculating the average color signal among each pixel in the frame image N. The equation for the frame image N+1 is calculated in a similar fashion.

In Step S807, the scanning direction is changed, i.e. inverted. Thereby, preparation for reading the next frame image is set. Then, the process ends.

According to this embodiment, in the case that the CMOS imaging sensor 124 cannot always scan alternatingly, the imager 100 can still display an image with minimal distortion on the LCD monitor 114 by scanning alternatingly when only a dynamic subject is photographed.

Note that, the rolling shutter may output an analog image signal for each row of the CMOS imaging sensor 124, i.e. for each photodiode aligned in the short direction. The CMOS imaging sensor 124 outputs an analog image signal from left to right from the imaging area, and then outputs an analog image signal from right to left from the imaging area. Afterward, it outputs an analog image signal from left to right from the imaging area. That is, the CMOS imaging sensor 124 may output from left to right and from right to left alternatingly.

The DSP may calculate the differential S for the lines where scanning is completed in the frame image N, or for the scanning-completed lines and the nearby scanning-completed lines. This enables the movement of the subject to be detected more efficiently because the differential S is calculated for a region where the differential is greatest.

The differential S may not be calculated for all three color signals, and may instead be calculated for only one or two color signals. Moreover, the differential S may not be calculated for color signals at all, and may instead be calculated for brightness.

The imaging area is divided into multiple blocks as shown in FIG. 4, the averages of the signals in each block are calculated, and then the differential S may be obtained by calculating the summation of the differentials between the averages for all blocks calculated from the frame image N and calculated from the frame image N−1.

Note that, if the summation of the differences for all pixels cannot be calculated, a summation of the differences calculated at predetermined intervals may be used instead. This variation will decrease the time of calculation.

A summation of the differences between multiple pixels located in the vicinity of the central imaging area may also be calculated. The movement of a subject is accurately detected because a subject image is located with high probability in the vicinity of the central imaging area.

Moreover, when the difference between a line or row where scanning begins in the frame image N and a different line or row where scanning ends in the frame image N is smaller than or equal to a predetermined value in Step S703, Step S704 may not be processed. The equation for a frame image is not suitable in such case because it is determined that the digital camera is panning and the state of a subject does not change in the case that the difference is smaller than or equal to a predetermined value. Therefore, an image with minimal distortion can be obtained in the case that the digital camera 100 is panning.

Although the embodiments of the present invention has been described herein with references to the accompanying drawings, obviously many modifications and changes may be made by those skilled in the art without departing from the scope of the invention.

The present disclosure relates to subject matter contained in Japanese Patent Application No. 2009-144423 (filed on Jun. 17, 2009), which is expressly incorporated herein, by reference, in its entirety.

The invention claimed is:

1. An imager comprising:
   an imaging sensor that reads stored charges in a positive or negative direction and outputs image data created from the read charges;
   a comparator that calculates a differential between first image data output by said imaging sensor and second image data output by said imaging sensor immediately after the first image data is output, and determines whether the differential is larger than a first threshold value; and
   a composer that creates composite image data from the data of two images output by said imaging sensor;
   wherein, when said comparator determines that the differential is larger than the first threshold value, said composer creates the composite image data from the second image data and negatively scanned image data that is obtained by scanning in a direction which is opposite to the scanning direction of the second image data.

2. The imager according to claim 1, wherein said imaging sensor outputs the image data by alternating between reading the charges in the positive and negative directions, the first image data are negatively scanned image data obtained by scanning in a direction, which is opposite to the scanning direction of the second image data, and said composer creates a composite image data from the first image data and the second image data.

3. The imager according to claim 1, wherein, when said comparator determines that the differential is larger than the first threshold value, said imaging sensor outputs negatively scanned image data by scanning a direction that is opposite to the scanning direction of the first image data, and said composer creates a composite image data from the first image data and the second image data.

4. The imager according to claim 1, wherein said comparator calculates a summation of differentials between signal values of the first image data and the second image data for each corresponding pixel, and when case that the summation is larger than the first threshold, said composer creates a composite image data.

5. The imager according to claim 1, wherein said comparator calculates a summation of arbitrary differentials between signal values of the first image data and the second image data for each corresponding pixel, and when the summation is larger than the first threshold, said composer creates a composite image data.

6. The imager according to claim 1, wherein said imaging sensor has a central area at the center of an imaging area of said imaging sensor, said comparator calculates a summation of differentials between signal values in the central areas of the first image data and the second image data for each corresponding pixel, and when the summation is larger than the first threshold, said composer creates a composite image data.

7. The imager according to claim 1, wherein said imaging sensor has multiple detection areas that are obtained by dividing an imaging area, said comparator calculates average signal values of pixels in each detection area, and calculates a summation of differentials between the calculated averages for each corresponding detection area in the first and second image data, and determines whether the summation is larger than the first threshold.

8. The imager according to claim 2, wherein said imaging sensor has multiple detection areas that are obtained by dividing an imaging area, an initial scanning area is a detection area having a pixel that is scanned at a beginning, and said comparator calculates a summation of differentials between signal values of pixels in the initial scanning area of the first image data and signal values of pixels in the initial scanning area of the second image data, and determines whether the summation is larger than the first threshold.

9. The imager according to claim 1, wherein said imaging sensor has multiple detection areas that are obtained by dividing an imaging area,
   a terminal scanning area is a detection area having a pixel that is scanned at an end, and
   when differentials between signal values of pixels in an initial scanning area of the first image data and signal values of pixels in the initial scanning area of the second image data is are larger than the first threshold and the differentials between signal values of pixels in the terminal scanning area of the first image data and signal values of pixels in the terminal scanning area of the second image data are larger than the first threshold, said composer does not create the composite image.

10. The imager according to claim 1, wherein, when said comparator calculates a differential between the first image data and the second image data and determines that the differential is smaller than the first threshold value, said composer does not create the composite image.

11. The imager according to claim 1, wherein said comparator calculates a differential between all color signals of pixels in the first image data and the second image data and determines whether or not the differential is larger than the first threshold value.

12. The imager according to claim 1, wherein said composer calculates an average of image signal values included in the data of two images output by said imaging sensor, and creates the composite image from the calculated average.

13. The imager according to claim 1, wherein said imaging sensor outputs an image signal using a rolling shutter by which said imaging sensor reads charges for every line in the vertical direction.

* * * * *